(12) United States Patent
Nanavati et al.

(10) Patent No.: US 7,246,244 B2
(45) Date of Patent: **\*Jul. 17, 2007**

(54) IDENTITY VERIFICATION METHOD USING A CENTRAL BIOMETRIC AUTHORITY

(75) Inventors: Samir H. Nanavati, New York, NY (US); Rajkumar Nanavati, New York, NY (US)

(73) Assignee: FusionArc, Inc. A Delaware Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/153,221

(22) Filed: Jun. 15, 2005

(65) Prior Publication Data

US 2005/0251688 A1 Nov. 10, 2005

Related U.S. Application Data

(63) Continuation of application No. 09/311,928, filed on May 14, 1999, now Pat. No. 6,928,546.

(51) Int. Cl.
H04L 9/32 (2006.01)

(52) U.S. Cl. .................................. 713/186; 705/51

(58) Field of Classification Search .................. 726/9, 726/20, 17, 18, 19; 902/2, 3
See application file for complete search history.

(56) References Cited

U.S. PATENT DOCUMENTS

| | | | |
|---|---|---|---|
| 5,073,934 A | * | 12/1991 | Matyas et al. ................ 380/30 |
| 5,142,578 A | * | 8/1992 | Matyas et al. .............. 380/280 |
| 5,613,012 A | | 3/1997 | Hoffman et al. |
| 5,615,277 A | | 3/1997 | Hoffman et al. |
| 5,706,427 A | | 1/1998 | Tabuki |
| 5,790,669 A | | 8/1998 | Miller et al. |

(Continued)

FOREIGN PATENT DOCUMENTS

WO WO97/08868 3/1997

OTHER PUBLICATIONS

George I. Davida et al. "On Enabling Secure Applications Through Off-line Biometric Identification" IEEE 1998, pp. 148-157.

(Continued)

*Primary Examiner*—Matthew B. Smithers
(74) *Attorney, Agent, or Firm*—Katten Muchin Rosenman LLP (57) ABSTRACT

A method performs biometric verifications to authenticate the identification of users using a central biometric authority (CBA). This allows parties to an electronic transaction to be assured of each other's identity. Specifically, at the sender side, a first message to a receiver is generated, wherein the first message includes a message text and a unique message identifier (UMI). At the sender side, a second message concerning a posting to the CBA is also generated, wherein the second message includes the sender's biometric sample, the UMI, and the sender's submission profile record. At a receiver side, it is decided that if a receiver wishes to verify the sender's identity and if so, the first message is automatically verified. At the receiver side, a third message concerning a receiver's posting to the CBA is issued, the third message including only the UMI, as received from the sender side. Finally, at the CBA, a reply to the third message is provided, the reply including the sender's verification result.

98 Claims, 5 Drawing Sheets

U.S. PATENT DOCUMENTS

| | | |
|---|---|---|
| 5,790,674 A | 8/1998 | Houvener et al. |
| 5,799,083 A | 8/1998 | Brothers et al. |
| 5,799,086 A | 8/1998 | Sudia |
| 5,802,199 A | 9/1998 | Pare, Jr. et al. |
| 5,805,719 A | 9/1998 | Pare, Jr. et al. |
| 5,838,812 A | 11/1998 | Pare, Jr. et al. |
| 5,841,970 A | 11/1998 | Tabuki |
| 5,850,442 A | 12/1998 | Muftic |
| 5,850,451 A | 12/1998 | Sudia |
| 5,857,022 A | 1/1999 | Sudia |
| 5,870,723 A * | 2/1999 | Pare et al. ............ 705/39 |
| 5,930,804 A | 7/1999 | Yu et al. |
| 6,026,166 A | 2/2000 | LeBourgeois et al. |
| 6,038,315 A | 3/2000 | Strait et al. |
| 6,105,010 A | 8/2000 | Musgrave |
| 6,167,517 A | 12/2000 | Gilchrist et al. |
| 6,182,076 B1 | 1/2001 | Yu et al. |
| 6,202,151 B1 | 3/2001 | Musgrave et al. |
| 6,230,148 B1 | 5/2001 | Pare, Jr. et al. |
| 6,269,348 B1 * | 7/2001 | Pare et al. ............ 705/39 |
| 6,310,966 B1 | 10/2001 | Dulude et al. |
| 6,332,193 B1 | 12/2001 | Glass et al. |
| 6,366,682 B1 | 4/2002 | Hoffman et al. |
| 6,381,631 B1 | 4/2002 | van Hoff |
| 6,397,198 B1 | 5/2002 | Hoffman et al. |
| 6,411,728 B1 | 6/2002 | Lee et al. |
| 6,424,249 B1 | 7/2002 | Houvener |
| 6,484,260 B1 * | 11/2002 | Scott et al. ............ 713/186 |
| 6,580,814 B1 | 6/2003 | Ittycheriah et al. |
| 6,581,042 B2 | 6/2003 | Pare, Jr. et al. |
| 6,591,002 B2 | 7/2003 | Lee et al. |
| 6,594,376 B2 | 7/2003 | Hoffman et al. |
| 6,607,136 B1 * | 8/2003 | Atsmon et al. ............ 235/492 |
| 6,662,166 B2 * | 12/2003 | Pare et al. ............ 705/39 |
| 6,879,966 B1 | 4/2005 | Lapsley et al. |
| 6,920,435 B2 | 7/2005 | Hoffman et al. |
| 6,928,546 B1 * | 8/2005 | Nanavati et al. ............ 713/186 |
| 6,950,810 B2 * | 9/2005 | Lapsley et al. ............ 705/78 |
| 6,957,770 B1 | 10/2005 | Robinson |
| 6,980,670 B1 | 12/2005 | Hoffman et al. |
| 6,985,608 B2 | 1/2006 | Hoffman et al. |
| 7,004,389 B1 | 2/2006 | Robsinson et al. |
| 7,082,415 B1 | 7/2006 | Robsinson et al. |
| 2001/0029493 A1 | 10/2001 | Paro, Jr. et al. |
| 2001/0039533 A1 | 11/2001 | Pare, Jr. et al. |
| 2002/0019811 A1 | 2/2002 | Lapsley et al. |
| 2002/0056043 A1 | 5/2002 | Glass |
| 2002/0111917 A1 | 8/2002 | Hoffman et al. |
| 2002/0154795 A1 | 10/2002 | Lee et al. |
| 2002/0174067 A1 | 11/2002 | Hoffman et al. |
| 2003/0014372 A1 * | 1/2003 | Wheeler et al. ............ 705/71 |
| 2003/0135740 A1 * | 7/2003 | Talmor et al. ............ 713/186 |
| 2004/0020982 A1 | 2/2004 | Hoffman et al. |
| 2004/0128249 A1 | 7/2004 | Hoffman et al. |
| 2005/0203841 A1 | 9/2005 | Hoffman et al. |

OTHER PUBLICATIONS

"HAAPI-103: Human Authentication—Application Program Interface (HA-API) Ver 1.03" pp. 1-48, date unknown.

"Schedule/Notes from HA-API Steering Group Meeting" Jan. 22, 1998.

"The Human Authentication API (HA-API) Project" Presented to The Government Biometrics Consortium by The National Registry, Inc. Dec. 9, 1997.

"Human Authentication—Application Program Interface (HA-API) Ver 2.0", Apr. 22, 1998, pp. 1-82.

Richard Nawrot. "New York State Department of Social Services Automated Finger Imaging System (AFIS)", pp. 3-15, http://www.ct.gov/dss/cwp/view.asp?a=2349&q=304704, date unknown.

Ken Phillips. "ID System Worth a Look" PC Week, May 4, 1998, p. 133, vol. 15, No. 18.

Lawrence A. Reinert et al. "Tokeneer: User Authentication Techniques Using Public Key Certificates Part 1: Certificate Options" Version 1.0, Dec. 24, 1997, pp. 1-45.

"Who knows who you are?" Infoworld, Jun. 16, 1997, p. 108, vol. 18, No. 24.

"Biometrics in Human Services User Group Newsletter" State of Connecticut Department of Social Services, Feb. 1998, pp. 1-19, vol. 2, Issue 1.

Ted Camus, Ph. D. et al. "Sensar Secure Iris Identification System", Proceedings of the Fourth IEEE Workshop on Applications of Computer Vision (WACV '98), 1998, pp. 1-2.

"Forget the PIN, just look into the ATM's camera" SCI-TECH Story Page from http://www.cnn.com/TECH9711/30/eyeball.id.ap/, Nov. 30, 1997, pp. 1-4.

"EYEdentity" Sensor Inc, date unknown.

Benjamin Wright "Eggs in Baskets: Distributing the Risks of Electronic Signatures" Jun. 22, 1995, pp. 1-13.

Benjamin Wright "Eggs in Baskets: Distributing the Risks of Electronic Signatures" Practising Law Institute, Patents Copyrights, Trademarks, and Literary Property Course Handbook Series, Sep. 1996, pp. 1-10.

Benjamin Wright "Eggs in Baskets: Distributing the Risks of Electronic Signatures" Jon Marshall Journal of Computer and Information Law, Winter 1997, pp. 1-10.

International Search Report Dated May 30, 2002, for international application PCT/US02/00567.

* cited by examiner

IDENTITY VERIFICATION METHOD USING A CENTRAL BIOMETRIC AUTHORITY

CROSS-REFERENCE TO RELATED APPLICATION

The present application is a continuation application of and claims priority under 35 U.S.C. § 120 from U.S. patent application Ser. No. 09/311,928, which was filed on May 14, 1999 now U.S. Pat. No. 6,928,546, was pending at the time at which the present application was filed, and is hereby incorporated by reference.

FIELD OF THE INVENTION

The present invention relates to an identity verification system; and, more particularly, to a method for effectively establishing the identification of users by utilizing a central biometric authority (CBA).

BACKGROUND OF THE INVENTION

It is known that a public/private key infrastructure is (PKI) is an excellent mechanism to ensure that data remains confidential and unchanged during transit over insecure networks such as the Internet. The PKI is based on the premise that a user has two mathematically related numerical keys, a private key and a public key, which serve to encrypt data. It is possible to secure a message by encrypting it with a sender's private key and a receiver's public key, which is obtained from a repository known as a certificate authority (CA). The receiver can read the message by decrypting it using his private key and the sender's public key.

The keys used in the PKI are very long; and, the longer they are, the more secure the system is. It is not feasible, however, for a user to remember or input a long key, e.g., 64 character or longer, when the user wants to send or receive a message. To prevent unauthorized users from accessing private keys and thus falsely originating, reading or changing messages, private keys are usually protected by a secret code.

Secret codes such as a personal identification number (PIN) and a password can be compromised through the use of various techniques well known in the art. For instance, people often choose easy to remember pins and passwords, which also make them easy to guess. Birthdays, children's names and social security numbers are among the most commonly chosen. To combat this, many organizations require that passwords be changed often, and many PINs are assigned to is prevent easily guessed PINs. Unfortunately, many times this leads to people writing down the secret information, making it accessible to fraud perpetrators.

Shoulder surfing is also a known technique that can be used to compromise secret codes. This simply involves a fraud perpetrator watching over the shoulder of the person entering the code as a secret code is entered.

Also brute force attacks can compromise secret codes. This method simply involves rapidly entering many codes, until the secret one is stumbled upon. Long codes, mixing letters and numbers and frequent changing of codes can prevent the success of brute force attempts. Additionally, systems locking up after a predefined number of incorrect password attempts can prevent the success of brute force attacks.

If the private key is compromised by one of the various techniques, then it is no longer possible to ensure that information is kept confidential and unchanged. Therefore, the reliability of the PKI depends on any method used to secure the private key.

Various techniques have been suggested to enhance the performance of the PKI, such as securing the private key with biometrics instead of secret codes. Biometrics are more secure than secret codes; and therefore the security of the PKI can be enhanced. Biometrics are technologies that verify identity based upon one's physiological or behavioral characteristics, such as one's fingerprint, eye scan, voice print, hand geometry, facial image or signature. Biometrics can verify one's identity by either performing a one-to-one comparison to authenticate a submission or by performing a one-to-many comparison to identify one's submission out of a database containing a plurality of biometrics samples. A biometric sample is either the direct information obtained from the user, e.g., fingerprint, hand image, voice print, facial image, handwriting sample or facial image, or processed form of such information. For example, a biometric sample includes one's fingerprint and a minutia template based on one's fingerprint. By securing the private key with a biometric, the sender can assure the integrity of the private key so that a message using it will not be fraudulently originated. Likewise, a receiver protecting his private key with a biometric can rest assured that no one will be able to read the message that is intended for his eyes only. Only after a local verification of the biometric submission releases a local private key, the message can be originated or read.

However, even with a biometrically protected private key, neither party is assured that biometric authentication is processed on the other end. That is, the sender is not assured that the intended receiver is reading the message and the receiver is not assured that the intended sender sent the message. For example, neither party is assured that the other party uses a biometric, instead of a secrete code to protect the private key. There are myriad problems with one party relying on the other to use a biometric system to secure the private key. Neither party can be certain that other party has installed a biometric system on its computer; nor can they be certain that the other party's private key is securely protected by the biometric.

Furthermore, there is no quality control over enrollment. That is, there is no way to ensure that samples submitted during enrollment belong to a claimed enrollee. And a fake sample could have been enrolled. Additionally, neither party has any control over the environment of other party's computer. In other words, there could be a network of supercomputers working to hack into the biometrically protected key. Dozens of attempts might be made before a sample is falsely verified.

If the sender and the receiver know with certainty that the other's private keys are being secured with a biometric, and if they could receive, interpret and rely on a biometric verification score, then the process would be secure. In addition, there are different disciplines of biometrics (e.g., voice verification, finger scanning, iris scanning, retina scanning, hand geometry), and many vendors within each of these disciplines, each having its own accuracy levels. There is currently no infrastructure for interpreting the verification score of each of these vendors. As such, if the receiver learns that the sender is verified on a biometric system from a vendor with a score of 75, they would have difficulty in determining if this was a good match. Finally, there is no way for a sender or receiver to ensure that the results of a biometric comparison are in fact legitimate. Because in the conventional approach all biometric verifications are performed on local machines, there is no assurance that the biometric verification is processed as it should.

A revocation list used in the PKI is a list of certificates that have been compromised and are thus no longer valid. The fundamental problem with relying solely on this list to confirm that a certificate is being used by a legitimate user is that revocation lists are not immediately updated. The moment a private key is compromised it does not appear on the revocation list. No one, with the exception of the fraud perpetrator, knows that a compromise has taken place and certainly he or she will not notify the CA to add that certificate to the revocation list. In addition, once is the certificate is reported as compromised, there is a time lag before the distributed lists are updated. The real value of a revocation list is to prevent repeated fraud to be perpetrated on the same certificate.

Without the CBA infrastructure, individual institutions will have to maintain local databases of biometric enrollments. There are a number of problems with this scenario. First, there is a large overhead for a typical company to create and maintain a biometric enrollment for each customer. This includes the cost and time to properly identify each enrollee, train each enrollee on proper system use, etc. Second, customers may trust a company enough to buy from them, but may not want to enroll in their biometric system. Third, there are a number of bills pending relating to the use of such local databases. Companies risk losing the right to use their database in the manner they intend, or having a databases or related processes that do not comply with new laws. There could be substantial overhead in restructuring databases to comply with new laws. There are liability issues with maintaining databases of enrollments. It is preferable for companies avoid such risks and not maintain an internal biometric database.

SUMMARY OF THE INVENTION

It is, therefore, a primary object of the present invention to provide a method capable of improving the performance of an identity verification system by verifying the identification of users using a CBA.

In accordance with one aspect of the present invention, there is provided a method for verifying the identity of one or more parties that are transmitting information, comprising the steps of:
(a) generating, on the sender side, a first message to the receiver, wherein the first message includes a substantive message to be transmitted and a unique message identifier (UMI);
(b) issuing, by one the parties, a second message concerning a posting to a central biometric authority (CBA), wherein the second message includes a biometric sample of the party, and the UMI, and a submission profile of the party;
(c) providing, at the CBA, verification of the party's biometric sample; and
(d) issuing, by the CBA, a third message including a verification result of the party.

In accordance with another aspect of the present invention, there is provided A method for verifying the identity of one or more parties to a transaction using biometrics whereby a third party stores the biometric templates and performs the identity verification.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
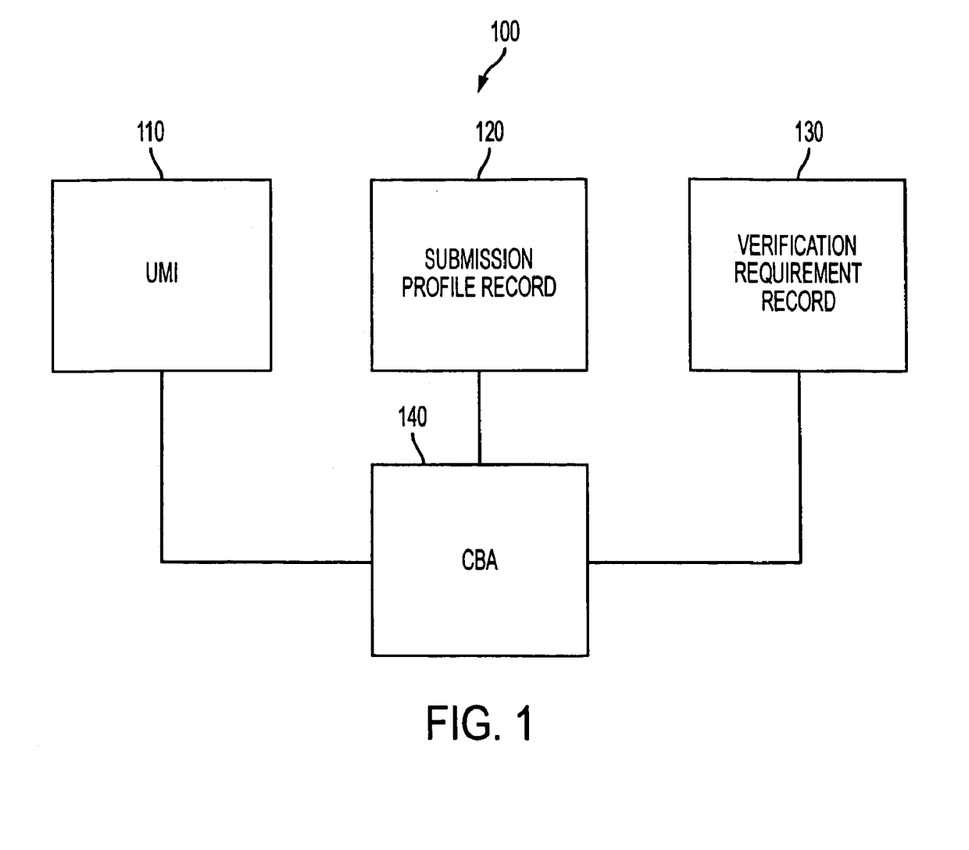
FIG. 1 is a schematic block diagram of an identity verification system in accordance with the present invention.

Referring to FIG. 1, there is provided a schematical block diagram of an identity verification system 100 incorporating therein a method for performing biometric verifications to authenticate the identification of users in accordance with the present invention.

A unique message identifier (UMI) block 110 establishes the identity of two parties that are involved with a message or transaction. The UMI block 110 has a sender/authorized transactor (AT) ID, a receiver/proxy ID, a data and time stamp and a hash value. The hash value is used to ensure that the message/biometric has not been altered. An additional number may be added to ensure that the UMI block 110 is indeed unique.

A submission profile record block 120 describes to the CBA 140 the system that captured a biometric template. The block 120 has information on a hardware maker and model, a software maker and version number, and which sample is being submitted.

A verification requirement record block 130 tells the CBA 140 the criteria that the sender/AT sets out for the receiver/proxy to successfully verify. The block 130 has a verification score being required to verify and a maximum number of attempts being allowed to attain the verification score and a minimum ESL, as defined below.

The CBA 140 has various features as follows. First of all, an ideal candidate company to serve as the CBA 140 is a trusted independent third party with the transaction processing capability to handle a high throughput of submitted samples, perform verification on the samples, and provide verification scores. These characteristics are similar to that of a CA (Certificate Authority). As such, there is likely to be much synergy from the CA and the CBA being the same entity. In the CBA 140, the enrollment process involves identifying an enrollee and collecting biometrics samples. The robustness of the identification process that performs during the enrollment will dictate to what degree the enrollment can be relied upon. This robustness is qualified by an enrollment security level (ESL). Whenever a verification score is reported, the ESL of the template to which comparison is being made is also returned.

In a preferred embodiment of the invention, it is likely that the CBA 140 will accept enrollments from other parties. Financial service providers are likely to serve among enrollment locations. During account opening, identification of customers already takes place, and therefore it would be a suitable time to enroll a new user into the CBA 140. The ESL will be affected by the trustworthiness of the point of enrollment. Thus, an enrollment at a large bank would have a much higher ESL than a self-guided enrollment at home.

In a preferred embodiment of the invention, it is likely that a single user will have multiple enrollment templates on file at the CBA 140. These enrollments may include enrollments from vendors of the same technology discipline, enrollments from different disciplines, enrollments of different biometric samples, enrollments with different ESL's, and any combination of the above. The actual number of enrollments for a given individual depends on their identification needs.

In addition to the templates, additional information or pointers to information can be maintained in the enrollee information profile (EIP). This information can only be released by the permission of the enrollee, and for specific purposes. For instance, the enrollee's age may be released to gain access to a bar or to purchase alcohol or cigarettes.

The enrollee's credit rating information may be released when applying for a new credit card or mortgage. Enrollee's group, group permissions, and organization affiliations may also described in the EIP. This would allow, for instance, a hotel operator to determine if someone is eligible for a corporate rate based upon the persons group or company affiliations.

It is possible for the enrollee to designate certain portions of his EIP as "open" to certain people or groups. This means that no submission from the enrollee is needed to access this information. For instance, an enrollee might make a list of his allergies to medicines open to anyone who is a member of the emergency room doctor group.

When a user enrolls into the CBA 140, the biometric template is stored in the CBA 140. Instead of multiple organizations (every organization that a customer does business with) having biometric enrollments and processing each submission, this activity is limited to the trusted CBA 140. Biometric submissions are never shared with anyone besides the CBA 140. The two parties communicating with each other never share submissions with one another. Biometric information shared between the parties is limited to verification scores and ratings, which are shared only via the CBA 140. The enrollment templates on file with the CBA 140 are never released during standard transactions. The structure is analogous to the secure electronic transaction (SET) protocol for credit card transactions. In the SET framework, a merchant never sees the credit card number of a customer, only the approval that the credit card is valid and sufficient credit is available. In the same way, with CBA, biometric submissions are never shared between parties, only the approval that verification took place is shared.

It is also possible for an enrollee to designate another person or persons as a proxy for themselves. This may be a full function proxy, or limited to specific transactions. A permanent proxy authorization posting is made, which grants the permissions. Such proxies, in most cases, can be revoked. By definition, the CBA 140 is a central authority, acting as a simple entity. While the CBA 140 virtually acts as a single authority, where verification can be performed and scores returned the physical structure may be distributed. This distribution may be for performance, throughput or other reasons. Different groups offering competing CBA services may duplicate each other services and data. There may be duplicate (in whole or part) CBAs for backup purposes, e.g., disaster recovery.

For off-line transactions, biometrics templates will be stored on portable medium such as smart cards or magnetic stripe cards. There is a need, however, to allow for easy recreation of these cards should they be lost or stolen. The CBA serves as a repository for these templates. As such, there may be templates on record for an enrollee that are not accessible on a normal day to day basis, but are only accessible by certain organizations to recreate lost templates. For those companies that do maintain local biometrics databases, the CBA will serve as an off site back up/hot site facility for the templates in case of data loss or system failure.

The need for a notary public is to establish the one's identity. Such identity is currently established by relying on one's photo ID and signature. In cases where a biometric can be submitted, the service by a notary public is accomplished by the CBA 140 more effectively.

After collecting a biometric sample, features are extracted to create the biometric data (sometimes referred to a template). The term "biometric sample" includes the direct sample and the template created therefrom. The CBA 140 architecture can function with either the biometric sample or the measurements of the sample. There are advantages and disadvantages of each. By sending the measurements of the sample, less information needs to be sent, thus requiring less transaction time and less bandwidth. By sending the entire sample, less processing power and time is required at the point of capture, and more updated extraction algorithms can be used at the CBA 140. In addition, if the entire sample is sent, the sample can be more processed through multiple systems from different vendors.

Verification scores are only valuable if the reader of the score knows how to interpret it. Unfortunately, each biometric vendor reports scores in different ways. In some cases the scale is a logarithmic 0 to 1, in other cases the scale is a linear 1 to 100. In some cases, high scores are best, and in other low scores are best. Even when the same relative scales are used, different technologies and different vendors have different accuracy levels. Thus, a score of 75 out of an ideal 100 on a retina scan unit may carry a very different confidence level than a 75 out of an ideal 100 on a dynamic signature verification system. As such, the verification score-rating table classifies vendors output into easily understandable categories. The objective analysis relates to the different vendors on the same scale, and the subjective analysis relates to different technologies based on their underlying performance. This analysis classifies each verification score into categories (or rating) such as "high", "medium", "low", and "fail" with regard to the confidence of the match. This latter analysis is optional, and not a required aspect of the CBA 140.

Hereinafter, four embodiments of the CBA 140 will be illustratively provided in detail with reference to FIGS. 2A-2D, which depict the embodiments, respectively. The first and second embodiments relate to electronic commerce and messaging and the third and fourth embodiments relate to face to face transactions.

Figure 2A:
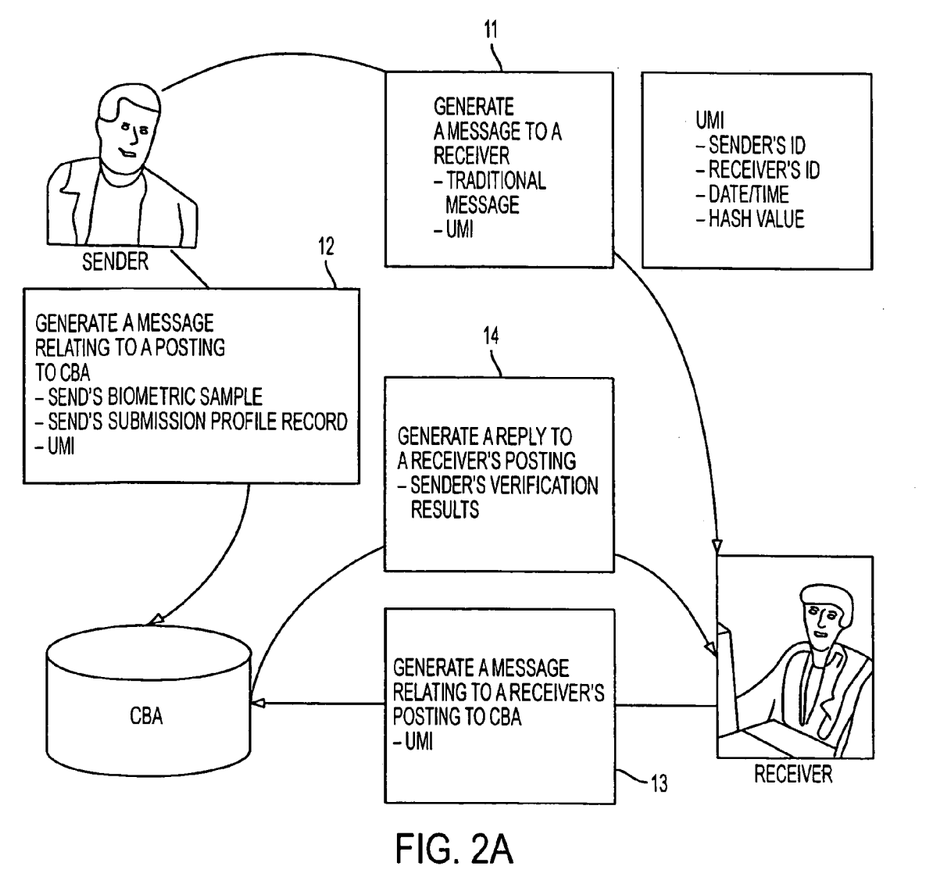
FIGS. 2A-2D present drawings for illustrating implementations of a CBA in accordance with the present invention, respectively.

Specifically, in a first embodiment of the present invention, a method to verify the identity only of the sender of a message is described. A sample transaction is a customer sending a message to their bank to wire transfer money into their stockbroker's account.

With reference to FIG. 2A, at step 11, a sender generates a message to a receiver. The message includes the substantive message? and the UMI.

Meanwhile, at step 12, the sender generates a message relating to a posting to the CBA. This message includes the sender's biometrics sample, the UMI, and the sender's submission profile record. At step 13, it is necessary to take place only if the receiver desires verification of the sender's identity. In many cases (low risk level involved with message communication, low chance of suspected fraud, junk e-mail, etc.) this verification may not be desired, and the CBA process may never be completed. In this case, the step 12 will remain "unclaimed". An aging off to expiration scheme can be implemented to remove unclaimed posting after a predetermined amount of time. Note that in actual implementation, process at the receiver side may automate a seamless verification of every message regardless of content. Receiver generates a message relating to a receiver posting to the CBA, the message including only the UMI, as received from the sender's message. At step 14, the CBA generates a reply to a receiver's posting including only the sender's verification results.

Figure 2B:
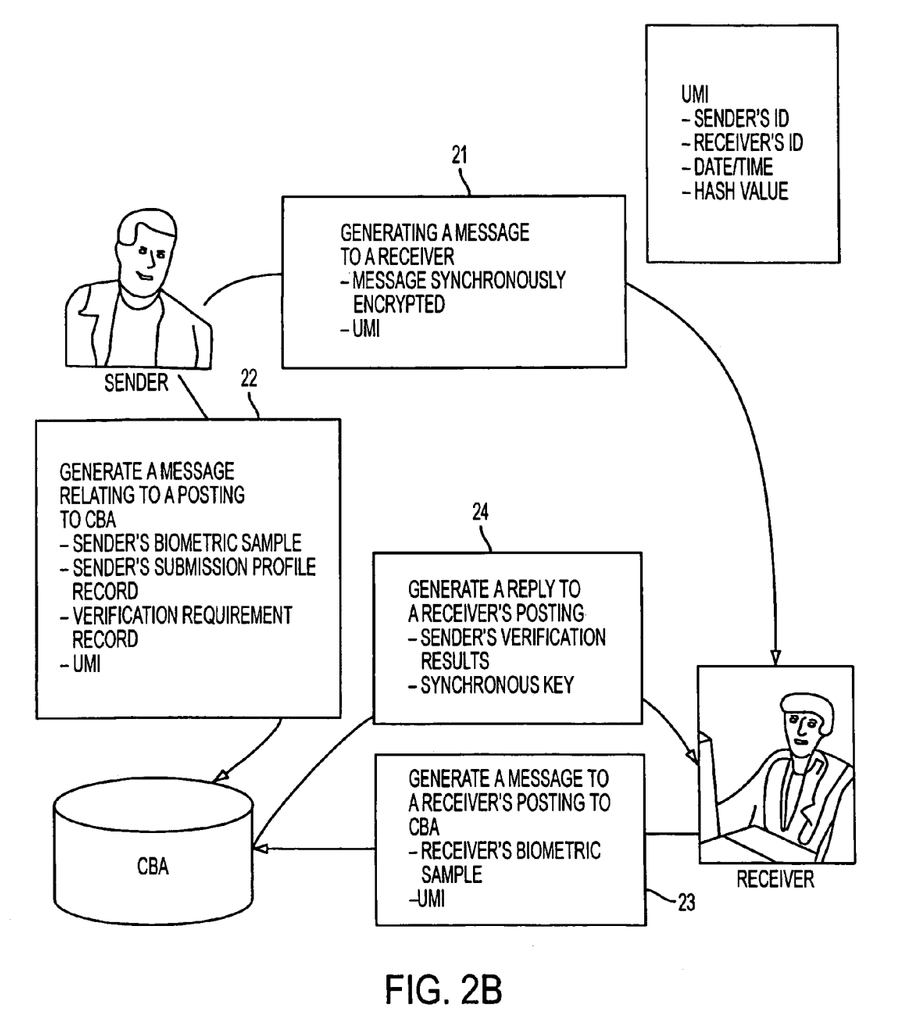

With reference to FIG. 2B, the second embodiment of the invention is provided, wherein a method to verify the identity of both the sender and the receiver of a message is described. A sample transaction is someone sending a secure message to an important client. To accomplish this, a synchronous or secret key is created for the transaction by the sender, and held from the receiver until they have been biometrically identified to the satisfaction of the sender.

Specifically, at step 21, a sender generates a message to a receiver. The message includes the substantive message encrypted with a synchronous key and the UMI.

Meanwhile, at step 22, the sender generates a message relating to a posting to the CBA. This message includes the sender's biometrics sample, the UMI, the sender's submission profile record, the synchronous key used in step, and the verification requirements record. At step 23, the receiver generates a message relating to a receiver posting to the CBA including the UMI, as received from the sender's message and the receiver's biometric sample. At step 24, the CBA generates a reply to the receiver's posting to CBA including the sender's verification results and the synchronous key to decrypt the message.

Figure 2C:
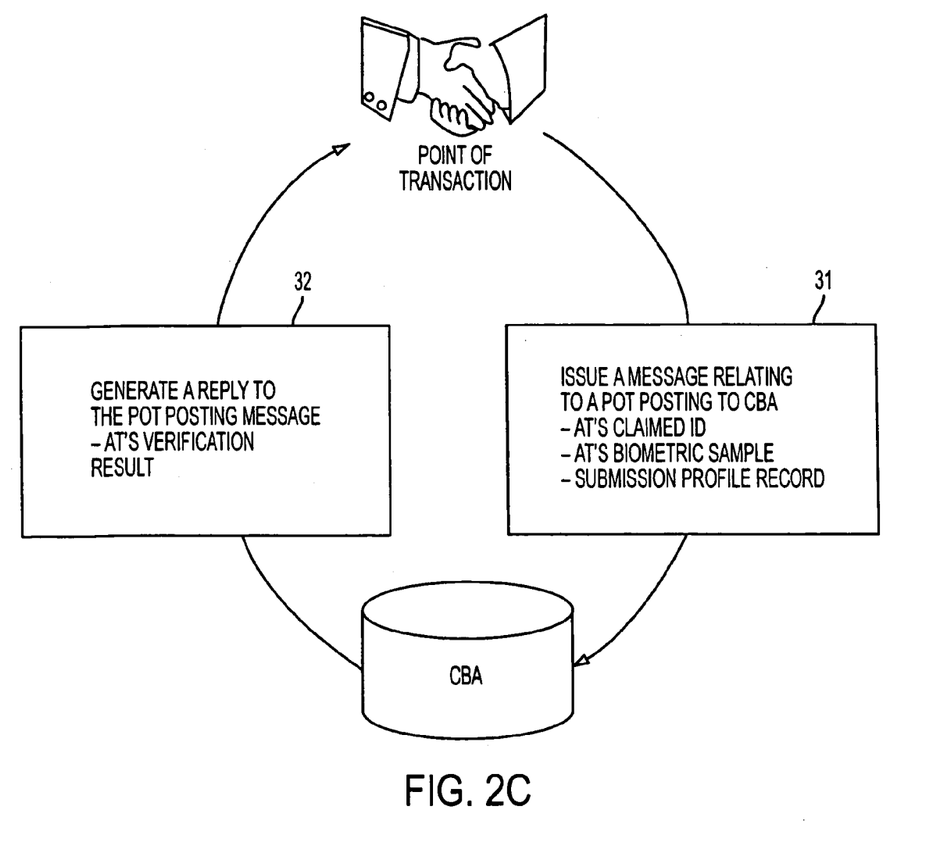

Referring now to FIG. 2C, the third embodiment of the invention is given, wherein a method to verify the identity of a person presenting themselves to complete any face-to-face transaction (authorized transactor or AT). A sample transaction is a credit card transaction at point of sale, a cash withdrawal at an ATM or teller window, or someone picking up their car at the mechanics shop.

Specifically, at step 31, at a point of transaction (POT) the POT operator (e.g., cashier) issues a message relating to a POT posting to CBA. This message includes the authorized transactor (AT)'s claimed identity, the AT's biometric sample and the POT submission profile record. At step 32, the CBA compares the biometric sample from the step 31 to that registered on the AT and generates the reply to the POT posting. This message includes only the AT's verification score/rating.

Figure 2D:
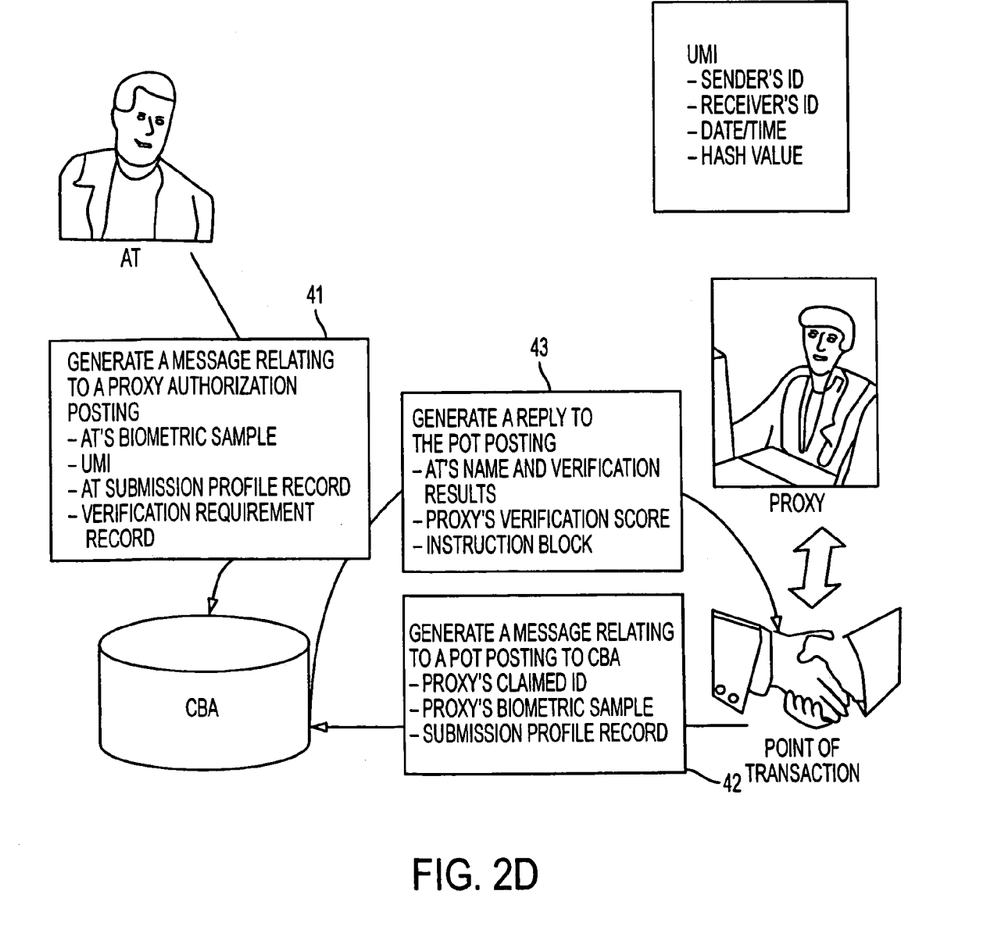

Referring to FIG. 2D, the fourth embodiment of the invention is provided, wherein a method to verify the identity of someone who is standing in as a proxy for an authorized transactor is illustrated. A sample transaction includes a proxy going to a day care center to pick up an AT's child. Specifically, at step 41, the AT generates a message relating to a proxy authorization posting, including their biometric sample, the UMI, the submission profile record, an instruction block and the verification requirements record. The instruction block is a message to the POT operator as to what the proxy should be allowed to do on their behalf. The instruction block will usually contain expiration data in addition to the allowed actions. At step 42, the POT operator generates a message relating to a POT posting to the CBA, including the proxy's claimed ID, the proxy's biometrics sample, and the POT submission profile record. At step 43, the CBA generates a reply to the POT posting, which includes the AT's name and verification results and the instruction block.

As may be seen from the above, by centralizing the verification of the sender's and/or receiver's biometrics sample, each can be assured as to the other's identity. Since there is control over the enrollment and verification conditions at the CBA, verification can safely be interpreted as an assurance of identity. In addition, since a message specific key as well as the PKI private keys is used, the concerns of non-biometrically protected copies of private keys are mitigated. Finally, by using conversion tables, users of different biometric systems can set minimum verification thresholds for users of systems different from their own. While it is not essential for a CBA system to be used in conjunction with a PKI, all embodiments of the present invention to be described later use a CBA in addition to a PKI. It is recognized that, although PKI and CBA work very well together, they may be used independently.

Prior to the CBA, there has been little work to establish an infrastructure to automate the exchange of biometric samples for day to day identification needs. The CBA serves as a point of verification for any transaction where identity must be established. Additionally, an authorized transactor can designate another person as their proxy to carry out a transaction. Furthermore, the need for each company to build and maintain local databases of biometric enrollments and process verifications are reduced. And since biometrics samples and templates are not shared with anyone except the trusted CBA, privacy is increased. Finally, there is an ability to determine the authority of an individual to perform a specific transaction, by consulting the enrollee information profile.

While the present invention has been shown and described with respect to the particular embodiments, it will be apparent to those skilled in the art that many changes and modifications may be made without departing from the spirit and scope of the invention as defined in the appended claims.

What is claimed is:

1. A method for processing information from a first party to a transaction, comprising the steps of:
    obtaining a direct biometric sample from the first party to the transaction, without requiring a private code;
    processing the first party's direct biometric sample to create biometric data;
    comparing the first party's biometric data, without the private code, against biometric information previously stored in a database of a third party that has biometric information from a plurality of parties;
    generating a result based on the comparison;
    transmitting the result of the comparison to the second party to the transaction.

2. The method of claim 1, wherein the processing step processes a biometric sample of a proxy for the first party, and
    transmits the result of a comparison of the proxy's biometric sample, with previously stored biometric information of the proxy, to the second party to the transaction.

3. The method of claim 1, wherein the biometric data contains sample features derived from the biometric sample.

4. The method of claim 1, wherein the direct biometric sample and the biometric data contain different amounts of data.

5. The method of claim 1, wherein the biometric data cannot be reverse-engineered to create the biometric sample.

6. The method of claim 1, wherein the third party is made up of a plurality of processors that form one virtual authority.

7. The method of claim 1, wherein the direct biometric sample is obtained from the first party utilizing a device that is not a handheld wireless portable device.

8. The method of claim 1, wherein the direct biometric sample is obtained from the first party utilizing a fixed point of sale system.

9. The method of claim 1, wherein the private code is a personal identification number (PIN).

10. The method of claim 1, wherein the first party to the transaction and the third party are not within arm's reach of each other.

11. The method of claim 1, wherein the first party to the transaction and the third party are not located within the same physical facility.

12. The method of claim 1, wherein the first party does not have direct physical access to the third party.

13. The method of claim 2, wherein the first party to the transaction is an authorized transactor, and the second party is a point of transaction operator.

14. The method of claim 13, further comprising the steps of:
generating, by a point of transaction operator, a message to the third party, wherein the message includes the authorized transactor's claimed identity, biometric information from the authorized transactor and a submission profile of the point of transaction.

15. The method of claim 1, wherein the obtaining step also includes additional information about the first party used by the third party.

16. The method of claim 15, wherein the additional information is public data.

17. The method of claim 15, wherein the additional information is private data.

18. The method of claim 15, wherein the additional information is selected from the group consisting of the first party's date of birth, place of employment, group affiliations, company affiliations, and point of transaction loyalty club affiliations.

19. The method of claim 15, wherein the additional information is selected from the group consisting of the first party's credit card, debit card, financial institution routing number, financial institution account number, electronic funds transfer, wire funds transfer, and electronic check information.

20. The method of claim 15, wherein the additional information is selected from the group consisting of the first party's allergies, health conditions, medical history, credit rating, and health insurance information.

21. The method of claim 15, wherein the additional information is used by the third party to limit the database search.

22. A method for processing information from a first party to a transaction, comprising the steps of:
obtaining a direct biometric sample from the first party to the transaction, without requiring a private code;
transmitting the direct biometric sample to a remote third party having a database that contains biometric information from a plurality of parties;
processing the first party's direct biometric sample to create biometric data;
comparing the first party's biometric data, without the private code, against biometric information previously stored by the remote third party in the database;
generating a result based on the comparison; and
transmitting the result of the comparison to a second party to the transaction.

23. The method of claim 22, wherein the obtaining step obtains a biometric sample of a proxy for the first party, and transmits the result of a comparison of the proxy's biometric sample, with a previously stored biometric information of the proxy to the second party to the transaction.

24. The method of claim 22, wherein the biometric data contains sample features derived from the biometric sample.

25. The method of claim 22, wherein the direct biometric sample and the biometric data contain different amounts of data.

26. The method of claim 22, wherein the biometric data cannot be reverse-engineered to create the biometric sample.

27. The method of claim 22, wherein the third party is made up of a plurality of processors that form one virtual authority.

28. The method of claim 22, wherein the direct biometric sample is obtained from the first party utilizing a device that is not a handheld wireless portable device.

29. The method of claim 22, wherein the direct biometric sample is obtained from the first party utilizing a fixed point of sale system.

30. The method of claim 22, wherein the private code is a personal identification number (PIN).

31. The method of claim 22, wherein the first party to the transaction and the third party are not within arm's reach of each other.

32. The method of claim 22, wherein the first party to the transaction and the third party are not located within the same physical facility.

33. The method of claim 22, wherein the first party does not have direct physical access to the third party.

34. The method of claim 23, wherein the first party to the transaction is an authorized transactor, and the second party is a point of transaction operator.

35. The method of claim 34, further comprising the steps of:
generating, by the point of transaction operator, a message to the third party, wherein the message includes the authorized transactor's claimed identity, biometric information from the authorized transactor and a submission profile of the point of transaction.

36. The method of claim 22, wherein the obtaining step also includes additional information about the first party used by the third party.

37. The method of claim 36, wherein the additional information is public data.

38. The method of claim 36, wherein the additional information is private data.

39. The method of claim 36, wherein the additional information is selected from the group consisting of the first party's date of birth, place of employment, group affiliations, company affiliations, and point of transaction loyalty club affiliations.

40. The method of claim 36, wherein the additional information is selected from the group consisting of the first party's credit card, debit card, financial institution routing number, financial institution account number, electronic funds transfer, wire funds transfer, and electronic check information.

41. The method of claim 36, wherein the additional information is selected from the group consisting of the first party's allergies, health conditions, medical history, credit rating, and health insurance information.

42. The method of claim 36, wherein the additional information is used by the third party to limit the database search.

43. A method for processing information from a first party to a transaction, comprising the steps of:

obtaining a direct biometric sample from the first party to the transaction, without requiring a private code;

processing the first party's direct biometric sample to create the first party's biometric data;

transmitting the first party's biometric data to a remote third party having a database that contains biometric information from a plurality of parties;

comparing the first party's biometric data, without the private code, against biometric information previously stored by the remote third party in the database;

generating a result based on the comparison; and transmitting the result of the comparison to a second party to the transaction.

44. The method of claim 43, wherein the obtaining step obtains a biometric sample of a proxy for the first party, and transmits the result of a comparison of the proxy's biometric sample, with previously stored biometric information of the proxy, to the second party to the transaction.

45. The method of claim 43, wherein the biometric data contains sample features derived from the biometric sample.

46. The method of claim 43, wherein the direct biometric sample and the biometric data contain different amounts of data.

47. The method of claim 43, wherein the biometric data cannot be reverse-engineered to create the biometric sample.

48. The method of claim 43, wherein the third party is made up of a plurality of processors that form one virtual authority.

49. The method of claim 43, wherein the direct biometric sample is obtained from the first party utilizing a device that is not a handheld wireless portable device.

50. The method of claim 43, wherein the direct biometric sample is obtained from the first party utilizing a fixed point of sale system.

51. The method of claim 43, wherein the private code is a personal identification number (PIN).

52. The method of claim 43, wherein the first party to the transaction and the third party are not within arm's reach of each other.

53. The method of claim 43, wherein the first party to the transaction and the third party are not located within the same physical facility.

54. The method of claim 43, wherein the first party does not have direct physical access to the third party.

55. The method of claim 44, wherein the first party to the transaction is an authorized transactor, and the second party is a point of transaction operator.

56. The method of claim 55, further comprising the steps of:

generating, by the point of transaction operator, a message to the third party, wherein the message includes the authorized transactor's claimed identity, biometric information from the authorized transactor and a submission profile of the point of transaction.

57. The method of claim 43, wherein the obtaining step also includes additional information about the first party used by the third party.

58. The method of claim 57, wherein the additional information is public data.

59. The method of claim 57, wherein the additional information is private data.

60. The method of claim 57, wherein the additional information is selected from the group consisting of the first party's date of birth, place of employment, group affiliations, company affiliations, and point of transaction loyalty club affiliations.

61. The method of claim 57, wherein the additional information is selected from the group consisting of the first party's credit card, debit card, financial institution routing number, financial institution account number, electronic funds transfer, wire funds transfer, and electronic check information.

62. The method of claim 57, wherein the additional information is selected from the group consisting of the first party's allergies, health conditions, medical history, credit rating, and health insurance information.

63. The method of claim 57, wherein the additional information is used by the third party to limit the database search.

64. A method for processing information from a first party to a transaction, comprising the steps of:

obtaining a biometric sample from the first party to the transaction, without requiring a private code;

transmitting the biometric sample to a remote third party having a database that contains biometric information from a plurality of parties;

comparing the first party's biometric sample, without the private code, against biometric information previously stored by the remote third party in the database;

generating a result based on the comparison; and transmitting the result of the comparison to a second party to the transaction.

65. The method of claim 64, wherein the obtaining step obtains a biometric sample of a proxy for the first party, and transmits the result of a comparison of the proxy's biometric sample, with previously stored biometric information of the proxy, to the second party to the transaction.

66. The method of claim 64, wherein the biometric data contains sample features derived from the biometric sample.

67. The method of claim 64, wherein the direct biometric sample and the biometric data contain different amounts of data.

68. The method of claim 64, wherein the biometric data cannot be reverse-engineered to create the biometric sample.

69. The method of claim 64, wherein the third party is made up of a plurality of processors that form one virtual authority.

70. The method of claim 64, wherein the direct biometric sample is obtained from the first party utilizing a device that is not a handheld wireless portable device.

71. The method of claim 64, wherein the direct biometric sample is obtained from the first party utilizing a fixed point of sale system.

72. The method of claim 64, wherein the private code is not a personal identification number (PIN).

73. The method of claim 64, wherein the first party to the transaction and the third party are not within arm's reach of each other.

74. The method of claim 64, wherein the first party to the transaction and the third party are not located within the same physical facility.

75. The method of claim 64, wherein the first party does not have direct physical access to the third party.

76. The method of claim 65, wherein the first party to the transaction is an authorized transactor, and the second party is a point of transaction operator.

77. The method of claim 76, further comprising the steps of:

generating, by the point of transaction operator, a message to the third party, wherein the message includes the authorized transactor's claimed identity, biometric information from the authorized transactor and a submission profile of the point of transaction.

78. The method of claim 64, wherein the obtaining step also includes additional information about the first party used by the third party.

79. The method of claim 78, wherein the additional information is public data.

80. The method of claim 78, wherein the additional information is private data.

81. The method of claim 78, wherein the additional information is selected from the group consisting of the first party's date of birth, place of employment, group affiliations, company affiliations, and point of transaction loyalty club affiliations.

82. The method of claim 78, wherein the additional information is selected from the group consisting of the first party's credit card, debit card, financial institution routing number, financial institution account number, electronic funds transfer, wire funds transfer, and electronic check information.

83. The method of claim 78, wherein the additional information is selected from the group consisting of the first party's allergies, health conditions, medical history, credit rating, and health insurance information.

84. The method of claim 78, wherein the additional information is used by the third party to limit the database search.

85. A method for verifying a first party's identity to a transaction using biometric sample data, comprising the steps of:
   obtaining biometric sample data from the first party as part of the transaction, without requiring a private code;
   transmitting the obtained first party's biometric sample data to a remote third party centralized biometric authority (CBA) database for verification, the database having biometric information from a plurality of parties;
   comparing the party's biometric sample data, without the private code, against the biometric information stored on the CBA database;
   verifying the identity of the first party when a match occurs during the comparison; and
   issuing, by the CBA, a reply to a second party based upon the verification result.

86. The method of claim 85, wherein the private code is a personal identification number (PIN).

87. The method of claim 85, wherein the first party whose identity is being verified is an authorized transactor, and the party seeking verification is a point of transaction.

88. The method of claim 87, further comprising the steps of:
   generating, by a point of transaction operator, a message to a CBA, wherein the message includes the authorized transactor's claimed identity, a biometric sample of the authorized transactor and a submission profile of the point of transaction;
   providing, at the CBA, verification of the authorized transactor's biometric sample.

89. The method of claim 88, wherein the reply includes the authorized transactor's verification information.

90. The method of claim 85, wherein the obtaining step also includes additional information about the first party used by the CBA to limit the database search.

91. The method of claim 90, wherein the additional information is public data.

92. The method of claim 85, wherein the additional information is private data.

93. The method of claim 90, wherein the additional information is selected from the group consisting of the first party's date of birth, place of employment, group affiliations, company affiliations, or point of transaction loyalty club affiliations.

94. The method of claim 90, wherein the additional information is selected from the group consisting of the first party's credit card, debit card, financial institution routing number, financial institution account number, electronic funds transfer, wire funds transfer, or electronic check information.

95. The method of claim 90, wherein the additional information is the first party's credit rating.

96. The method of claim 90, wherein the additional information is selected from the group consisting of the first party's allergies, health conditions, medical history or health insurance information.

97. The method of claim 90, wherein the additional information is used by the third party to limit the database search.

98. The method of claim 85 wherein obtaining step obtains a biometric sample of a proxy for the first party, and
   issuing the a reply to the second party of a verification of the identity of the proxy following a comparison of the proxy's biometric sample, with previously stored biometric information of the proxy, when there is a match.

* * * * *